United States Patent
Line et al.

(10) Patent No.: US 10,166,900 B2
(45) Date of Patent: Jan. 1, 2019

(54) INTERNAL UPPER SEATBACK SUPPORT FOR DRIVING AND SLEEPER SEATS

(71) Applicant: Ford Global Technologies, LLC, Dearborn, MI (US)

(72) Inventors: Johnathan Andrew Line, Northville, MI (US); Marcos Silva Kondrad, Macomb, MI (US); Robert Damerow, Garden City, MI (US); Paul Iacoban, Dearborn, MI (US); Daniel Ferretti, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/428,923

(22) Filed: Feb. 9, 2017

(65) Prior Publication Data

US 2018/0222362 A1     Aug. 9, 2018

(51) Int. Cl.
| | |
|---|---|
| *B60N 2/42* | (2006.01) |
| *B60N 2/90* | (2018.01) |
| *B60N 2/64* | (2006.01) |
| *B60N 2/34* | (2006.01) |

(52) U.S. Cl.
CPC .............. *B60N 2/914* (2018.02); *B60N 2/34* (2013.01); *B60N 2/643* (2013.01)

(58) Field of Classification Search
CPC ...... B60N 2/643; B60N 2/2222; B60N 2/665; B60N 2/68; B60N 2/914
USPC ..................... 297/284.1, 284.3, 284.6, 284.8
See application file for complete search history.

(56) References Cited

U.S. PATENT DOCUMENTS

| | | | |
|---|---|---|---|
| 2,576,343 A | 11/1951 | Hibbard et al. | |
| 2,797,739 A | 7/1957 | Orsini | |
| 3,451,261 A | 6/1969 | Olsen | |
| 4,106,081 A | 8/1978 | Turturici | |
| 4,272,119 A | 6/1981 | Adams | |
| 4,506,317 A | 3/1985 | Duddy | |
| 4,626,028 A | 12/1986 | Hatsutta et al. | |
| 4,709,961 A | 12/1987 | Hill | |
| 4,720,146 A * | 1/1988 | Mawbey ................ | B60N 2/914 |
| | | | 297/409 |
| 4,809,897 A | 3/1989 | Wright, Jr. | |
| 4,832,400 A | 5/1989 | Aoki et al. | |
| 4,955,571 A | 9/1990 | Lorence et al. | |

(Continued)

FOREIGN PATENT DOCUMENTS

| | | |
|---|---|---|
| DE | 19901072 C1 | 3/2000 |
| DE | 102005023602 A1 | 11/2006 |

(Continued)

*Primary Examiner* — Shin H Kim
(74) *Attorney, Agent, or Firm* — Vichit Chea; Price Heneveld LLP

(57) ABSTRACT

A vehicle seating assembly includes a frame having first and second side members. A seatback and a head restraint are supported on the frame. A paddle includes a lower pivot rod pivotally coupled between the first and second side members of the frame. The paddle is disposed proximate a top portion of the seatback, below the head restraint. A bladder is disposed between the paddle and the frame and is operable between an inflated condition, wherein the paddle is pivoted forward to support one of the upper back and neck of an occupant, and a deflated condition, wherein the paddle is pivoted rearward into the seatback.

18 Claims, 8 Drawing Sheets

(56) References Cited

U.S. PATENT DOCUMENTS

| | | | |
|---|---|---|---|
| 4,977,973 A | 12/1990 | Takizawa | |
| 5,011,225 A | 4/1991 | Nemoto | |
| 5,011,226 A | 4/1991 | Ikeda et al. | |
| 5,046,433 A | 9/1991 | Kramer et al. | |
| 5,058,953 A | 10/1991 | Takagi et al. | |
| 5,082,326 A * | 1/1992 | Sekido | B60N 2/914 297/284.6 |
| 5,092,507 A | 3/1992 | Szablak et al. | |
| 5,145,233 A | 9/1992 | Nagashima | |
| 5,297,010 A | 3/1994 | Camarota et al. | |
| 5,364,164 A | 11/1994 | Kuranami | |
| 5,370,035 A | 12/1994 | Madden, Jr. | |
| 5,511,842 A | 4/1996 | Dillon | |
| 5,521,806 A | 5/1996 | Hutzel et al. | |
| 5,567,011 A | 10/1996 | Sessini | |
| 5,732,994 A | 3/1998 | Stancu et al. | |
| 5,836,648 A | 11/1998 | Karschin et al. | |
| 5,845,965 A | 12/1998 | Heath et al. | |
| 5,860,699 A * | 1/1999 | Weeks | A47C 7/467 297/284.1 |
| 5,868,466 A * | 2/1999 | Massara | A47C 7/467 297/284.6 |
| 5,884,968 A * | 3/1999 | Massara | B60N 2/23 297/216.12 |
| 6,015,198 A | 1/2000 | Stair | |
| 6,032,587 A | 3/2000 | Salenbauch et al. | |
| 6,079,776 A * | 6/2000 | Breitner | B60N 2/838 297/216.12 |
| 6,090,148 A | 7/2000 | Weber et al. | |
| 6,096,086 A | 8/2000 | Weber et al. | |
| 6,110,216 A | 8/2000 | Weber et al. | |
| 6,123,377 A | 9/2000 | Lecher et al. | |
| 6,135,558 A | 10/2000 | Behrens et al. | |
| 6,135,561 A | 10/2000 | Kruger et al. | |
| 6,183,033 B1 | 2/2001 | Arai et al. | |
| 6,213,549 B1 | 4/2001 | Wieclawski | |
| 6,220,660 B1 | 4/2001 | Bedro et al. | |
| 6,273,511 B1 | 8/2001 | Wieclawski | |
| 6,347,590 B1 | 2/2002 | D'Annunzio et al. | |
| 6,419,314 B1 | 7/2002 | Scheerhorn | |
| 6,439,636 B1 | 8/2002 | Kuo | |
| 6,478,373 B1 | 11/2002 | Hake et al. | |
| 6,547,323 B1 | 4/2003 | Aitken et al. | |
| 6,565,150 B2 | 5/2003 | Fischer et al. | |
| 6,565,153 B2 | 5/2003 | Hensel et al. | |
| 6,601,901 B1 * | 8/2003 | Schambre | B60N 2/067 296/65.09 |
| 6,666,517 B2 * | 12/2003 | Clough | A47C 7/38 297/410 |
| 6,719,343 B2 | 4/2004 | Emerling et al. | |
| 6,719,367 B2 | 4/2004 | Mic et al. | |
| 6,719,368 B1 | 4/2004 | Neale | |
| 6,746,065 B1 | 6/2004 | Chan | |
| 6,761,388 B2 | 7/2004 | Lein et al. | |
| 6,848,817 B2 | 2/2005 | Bos et al. | |
| 7,021,694 B1 | 4/2006 | Roberts et al. | |
| 7,025,420 B2 | 4/2006 | Guinea Pena et al. | |
| 7,040,705 B2 * | 5/2006 | Clough | A47C 7/38 297/410 |
| 7,055,904 B2 | 6/2006 | Skelly et al. | |
| 7,077,472 B2 | 7/2006 | Steffens, Jr. | |
| 7,080,865 B2 | 7/2006 | Bergeron et al. | |
| 7,114,755 B1 | 10/2006 | Sturt et al. | |
| 7,192,070 B2 | 3/2007 | Radu et al. | |
| 7,270,452 B2 | 9/2007 | Wang | |
| 7,278,681 B2 | 10/2007 | Lilov et al. | |
| 7,293,507 B2 | 11/2007 | Depue et al. | |
| 7,296,839 B2 | 11/2007 | Scheerhorn | |
| 7,322,646 B2 | 1/2008 | Jammalamadaka et al. | |
| 7,328,818 B2 | 2/2008 | Prabucki | |
| 7,364,231 B2 | 4/2008 | Park et al. | |
| 7,364,239 B2 * | 4/2008 | Clough | A47C 7/38 297/391 |
| 7,393,052 B2 | 7/2008 | Humer et al. | |
| 7,431,365 B2 | 10/2008 | Sturt et al. | |
| 7,441,838 B2 * | 10/2008 | Patwardhan | B60N 2/888 297/216.13 |
| 7,455,016 B2 | 11/2008 | Perin | |
| 7,520,552 B2 | 4/2009 | Nakamura et al. | |
| 7,523,888 B2 | 4/2009 | Ferry et al. | |
| 7,537,364 B2 | 5/2009 | Misawa et al. | |
| 7,641,252 B2 | 1/2010 | Sturt et al. | |
| 7,644,982 B2 | 1/2010 | Paluch | |
| 7,748,762 B2 | 7/2010 | Mayne, Jr. | |
| 7,770,953 B2 | 8/2010 | Koarai | |
| 7,793,597 B2 | 9/2010 | Bart et al. | |
| 7,798,072 B2 | 9/2010 | Becker et al. | |
| 7,834,750 B1 | 11/2010 | Hertz et al. | |
| 7,845,729 B2 | 12/2010 | Yamada et al. | |
| 7,857,381 B2 | 12/2010 | Humer et al. | |
| 7,934,762 B2 | 5/2011 | Hollenbeck et al. | |
| 8,002,323 B2 | 8/2011 | Jones et al. | |
| 8,033,610 B2 * | 10/2011 | Graber | B60N 2/2222 297/284.1 |
| 8,052,194 B2 | 11/2011 | Sayama | |
| 8,104,836 B2 | 1/2012 | Little | |
| 8,109,565 B2 | 2/2012 | Waters et al. | |
| 8,141,930 B2 | 3/2012 | Sayama | |
| 8,167,366 B2 | 5/2012 | Charpentier et al. | |
| 8,177,281 B2 | 5/2012 | Sayama | |
| 8,201,890 B1 | 6/2012 | Nagoaka Mihara | |
| 8,262,164 B2 | 9/2012 | Ito et al. | |
| 8,287,024 B2 | 10/2012 | Sayama | |
| 8,287,037 B2 | 10/2012 | Sayama | |
| 8,336,955 B2 | 12/2012 | Sayama | |
| 8,388,054 B2 | 3/2013 | Sayama | |
| 8,397,963 B2 | 3/2013 | Singh | |
| 8,421,407 B2 | 4/2013 | Johnson | |
| 8,496,295 B2 | 7/2013 | Chen | |
| 8,528,978 B2 | 9/2013 | Purpura et al. | |
| 8,534,750 B2 | 9/2013 | Sayama | |
| 8,540,308 B2 | 9/2013 | Aoki et al. | |
| 8,899,683 B2 | 12/2014 | Ito | |
| 8,998,327 B2 | 4/2015 | Cooney | |
| 9,105,809 B2 | 8/2015 | Lofy | |
| 9,150,152 B2 | 10/2015 | Sura et al. | |
| 9,168,850 B2 | 10/2015 | Meszaros et al. | |
| 9,187,019 B2 | 11/2015 | Dry et al. | |
| 9,205,774 B2 | 12/2015 | Kennemer et al. | |
| 9,399,418 B2 | 7/2016 | Line et al. | |
| 9,421,894 B2 | 8/2016 | Line et al. | |
| 9,452,838 B2 | 9/2016 | Meister et al. | |
| 9,566,888 B2 | 2/2017 | Kolich et al. | |
| 9,573,502 B2 | 2/2017 | Seki et al. | |
| 9,596,940 B2 | 3/2017 | Petzel et al. | |
| 9,610,872 B2 | 4/2017 | Dry et al. | |
| 9,649,962 B2 | 5/2017 | Line et al. | |
| 9,707,870 B2 * | 7/2017 | Line | B60N 2/427 |
| 9,889,773 B2 * | 2/2018 | Line | B60N 2/2222 |
| 2004/0012234 A1 | 1/2004 | Yamaguchi et al. | |
| 2004/0070240 A1 | 4/2004 | Haland et al. | |
| 2005/0120477 A1 | 6/2005 | Kennan | |
| 2005/0225145 A1 | 10/2005 | Furtado et al. | |
| 2005/0280296 A1 | 12/2005 | Ohchi et al. | |
| 2006/0006709 A1 | 1/2006 | Uno et al. | |
| 2006/0071517 A1 | 4/2006 | Humer et al. | |
| 2006/0100764 A1 | 5/2006 | Adams et al. | |
| 2006/0202524 A1 | 9/2006 | Yamaguchi | |
| 2006/0202525 A1 | 9/2006 | Yamaguchi | |
| 2006/0208517 A1 | 9/2006 | Nakamura et al. | |
| 2007/0170281 A1 | 7/2007 | Cooper et al. | |
| 2007/0205622 A1 | 9/2007 | Whitens et al. | |
| 2008/0012402 A1 | 1/2008 | Sekida | |
| 2008/0073950 A1 | 3/2008 | Ko | |
| 2008/0084098 A1 | 4/2008 | Humer et al. | |
| 2008/0088158 A1 | 4/2008 | Yokota et al. | |
| 2008/0110931 A1 | 5/2008 | Prabucki | |
| 2008/0129093 A1 | 6/2008 | Kim | |
| 2008/0191532 A1 * | 8/2008 | Wain | B60N 2/986 297/284.1 |
| 2008/0231067 A1 | 9/2008 | Nagle | |
| 2009/0167066 A1 | 7/2009 | Mori et al. | |
| 2009/0174206 A1 | 7/2009 | Vander Sluis et al. | |

(56) References Cited

U.S. PATENT DOCUMENTS

| | | |
|---|---|---|
| 2009/0218859 A1* | 9/2009 | Lawall ............... B60N 2/42763 297/216.1 |
| 2009/0309398 A1 | 12/2009 | Niitsuma et al. |
| 2010/0026060 A1 | 2/2010 | Niitsuma et al. |
| 2010/0066135 A1 | 3/2010 | Humer et al. |
| 2010/0066136 A1 | 3/2010 | D'Agostini |
| 2010/0090505 A1 | 4/2010 | Tarusawa et al. |
| 2010/0127540 A1 | 5/2010 | Park et al. |
| 2010/0148545 A1 | 6/2010 | Omori |
| 2010/0187875 A1 | 7/2010 | Sasaki et al. |
| 2010/0201167 A1 | 8/2010 | Wieclawski |
| 2010/0207414 A1 | 8/2010 | Tsuda et al. |
| 2010/0244478 A1 | 9/2010 | Depue |
| 2010/0264704 A1 | 10/2010 | Yasuda et al. |
| 2010/0270834 A1 | 10/2010 | Niitsuma |
| 2010/0270835 A1 | 10/2010 | Nitsuma |
| 2010/0295348 A1 | 11/2010 | Takayasu et al. |
| 2010/0308629 A1 | 12/2010 | Lee et al. |
| 2011/0187167 A1 | 8/2011 | Takayasu et al. |
| 2011/0272978 A1 | 11/2011 | Nitsuma |
| 2012/0068517 A1 | 3/2012 | Yetukuri et al. |
| 2012/0198616 A1 | 8/2012 | Makansi et al. |
| 2012/0212016 A1 | 8/2012 | Kanda |
| 2013/0153055 A1 | 6/2013 | Gaffoglio |
| 2014/0203615 A1 | 7/2014 | Little |
| 2014/0368015 A1 | 12/2014 | Basters et al. |
| 2015/0272333 A1* | 10/2015 | Zouzal ..................... B60N 2/66 297/284.7 |
| 2016/0355114 A1 | 12/2016 | Line et al. |
| 2018/0022246 A1* | 1/2018 | Patrick ................. B60N 2/4415 297/284.3 |

FOREIGN PATENT DOCUMENTS

| | | |
|---|---|---|
| EP | 2769904 A1 | 8/2014 |
| FR | 2833220 A | 10/1938 |
| FR | 2698594 A1 | 6/1994 |
| JP | H0775608 A | 3/1995 |
| WO | 2006067460 A1 | 6/2006 |
| WO | 2010144420 A1 | 12/2010 |
| WO | 2016070052 A1 | 5/2016 |

* cited by examiner

INTERNAL UPPER SEATBACK SUPPORT FOR DRIVING AND SLEEPER SEATS

FIELD OF THE DISCLOSURE

The present disclosure generally relates to a seatback support for a vehicle seating assembly, and more particularly to an internal upper seatback support for driving and sleeper seats for a vehicle seating assembly.

BACKGROUND OF THE DISCLOSURE

Seating assemblies and the flexible nature of those seating assemblies is becoming more important in today's world. The value of having an adjustable seating assembly provides increased worktime and increased comfort to an individual. Some seating assemblies include upper thoracic support that is adjustable between forward and rearward positions. Providing an aesthetically pleasing upper back support that is consistent with and generally seamless with the remainder of the seat provides value to the consumer.

SUMMARY OF THE DISCLOSURE

According to one aspect of the present disclosure, a vehicle seating assembly includes a frame having first and second side members. A seatback and a head restraint are supported on the frame. A paddle includes a lower pivot rod pivotally coupled between the first and second side members of the frame. The paddle is disposed proximate a top portion of the seatback, below the head restraint. A bladder is disposed between the paddle and the frame and is operable between an inflated condition, wherein the paddle is pivoted forward to support one of the upper back and neck of an occupant, and a deflated condition, wherein the paddle is pivoted rearward into the seatback.

According to another aspect of the present disclosure, a seating assembly includes a frame having first and second side members. A seatback is supported on the frame. A paddle includes a lower pivot rod pivotally coupled between the first and second side members of the frame. A bladder is disposed between the paddle and the frame and is operable between an inflated condition corresponding to a forward position of the paddle and a deflated position corresponding to a rearward position of the paddle.

According to yet another aspect of the present disclosure, a vehicle seating assembly includes a frame. A seatback is supported on the frame. A paddle is pivotally coupled with an upper portion of the frame. A bladder is disposed between the paddle and the frame and is configured to inflate to pivot the paddle between forward and rearward positions relative to the frame.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
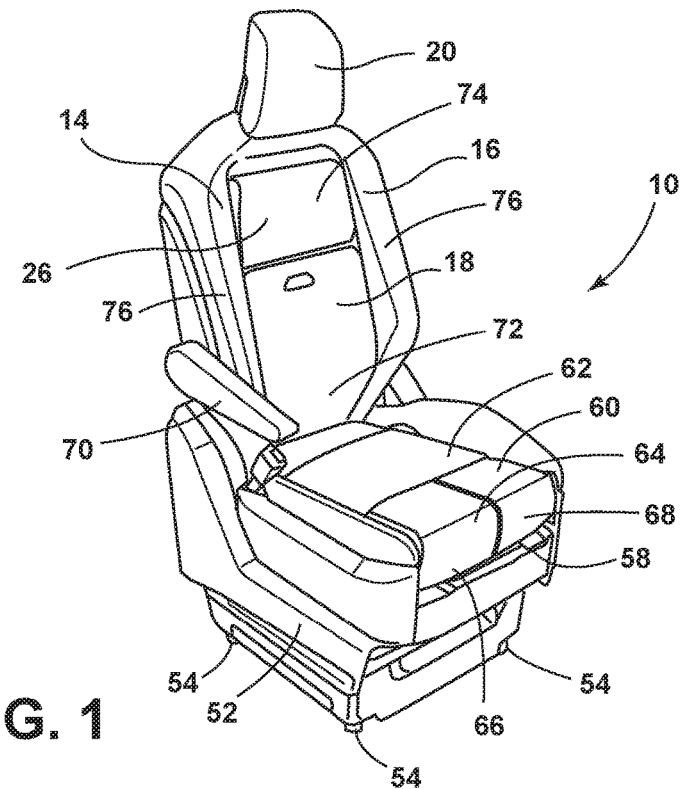
FIG. 1 is a top perspective view of one embodiment of a seating assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-12, reference numeral 10 generally designates a seating assembly that includes a frame 12 (FIG. 2) having first and second side members 14, 16. A seatback 18 and a head restraint 20 are supported on the frame 12. A paddle 22 includes a lower pivot rod 24 pivotally coupled between the first and second side members 14, 16 of the frame 12. The paddle 22 is disposed proximate a top portion 26 of the seatback 18, below the head restraint 20. A bladder 30 is disposed between the paddle 22 and the frame 12 and is operable between an inflated condition (FIG. 7B), wherein the paddle 22 is pivoted forward to support at least one of the upper back and neck of an occupant, and a deflated condition (FIG. 7A), wherein the paddle 22 is pivoted rearward into the seatback 18.

With reference to FIG. 1, the seating assembly 10 is generally constructed for use in a variety of environments, including residential or commercial applications, as well as in vehicles 50. The seating assembly 10 generally includes a seat base 52 supported on feet 54. The feet 54 may be operably coupled with a floor 56 of the vehicle 50. It will be understood that the feet 54 may be slidably coupled with the floor 56 or may maintain a stationary position relative to the floor 56 of the vehicle 50. The seat base 52 extends upwardly from the feet 54 and is configured to support a suspension assembly 58 and a seat 60. The seat 60 includes a cushion assembly configured to provide comfort to an occupant. In addition, the seat 60 includes a rear portion 62 and a forward portion 64. The forward portion 64 may include independent thigh supports 66, 68 configured to independently support each leg of an occupant. The seatback 18 is operably coupled with the seat 60 and is configured to pivot relative to the seat 60. In addition, the seatback 18 may include one or more seatback arms 70 pivotally coupled with the seatback 18. The seatback arms 70 provide support to the arms of an occupant. The seatback 18 includes a lower lumbar cushion 72 and an upper thoracic cushion 74. The upper thoracic cushion 74 is disposed proximate the paddle 22 and configured to rotate relative to the seatback 18. The seatback 18 also includes side bolsters 76 configured to cradle the sides of an occupant. The head restraint 20 is disposed on the seatback 18 and is operable between a plurality of vertical positions relative to the seatback 18.

Figure 2:
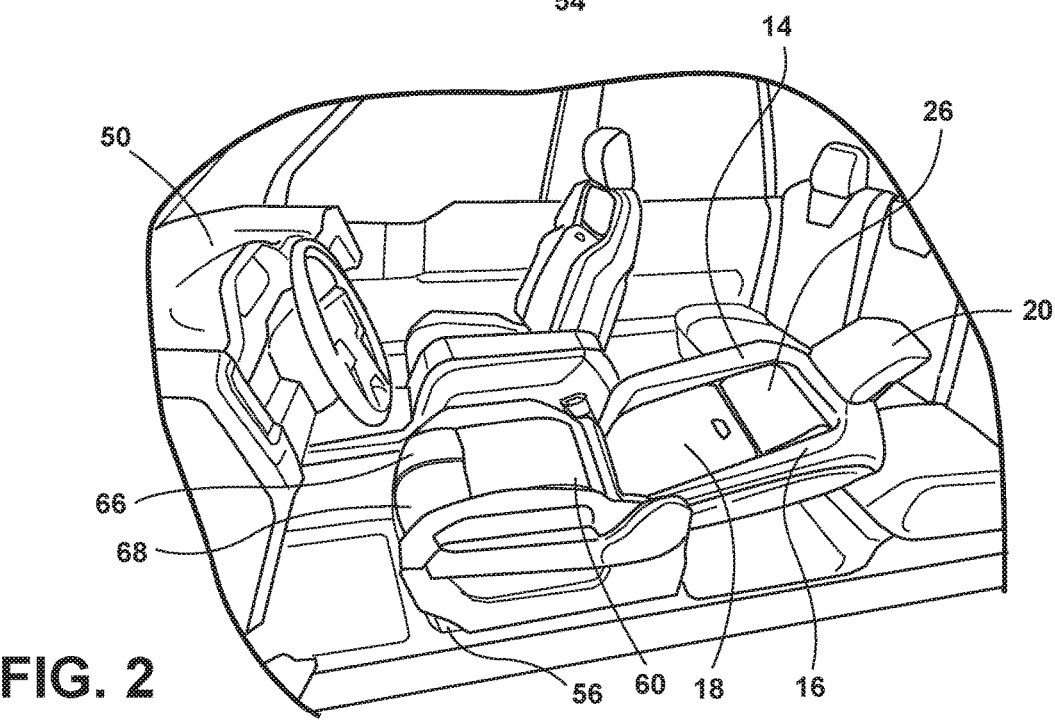
FIG. 2 is a front perspective view of a seating assembly of the present disclosure disposed in a vehicle.

Referring again to FIGS. 1 and 2, the seating assembly 10 is generally configured to provide sleeping accommodations to an occupant. Accordingly, the seatback 18 is configured to pivot rearward relative to the seat 60, such that the seat 60 and the seatback 18 are aligned or nearly aligned (FIG. 2). In this configuration, the seating assembly 10 can provide comfort to an occupant that wishes to rest or sleep for a period of time without leaving the safety of the vehicle 50. In an effort to provide increased comfort and support to the upper back of an occupant, the paddle 22 can rotate upward into abutting contact with an upper portion of the back of an occupant. This additional support lessens strain on the head and neck of the occupant.

Figure 3:
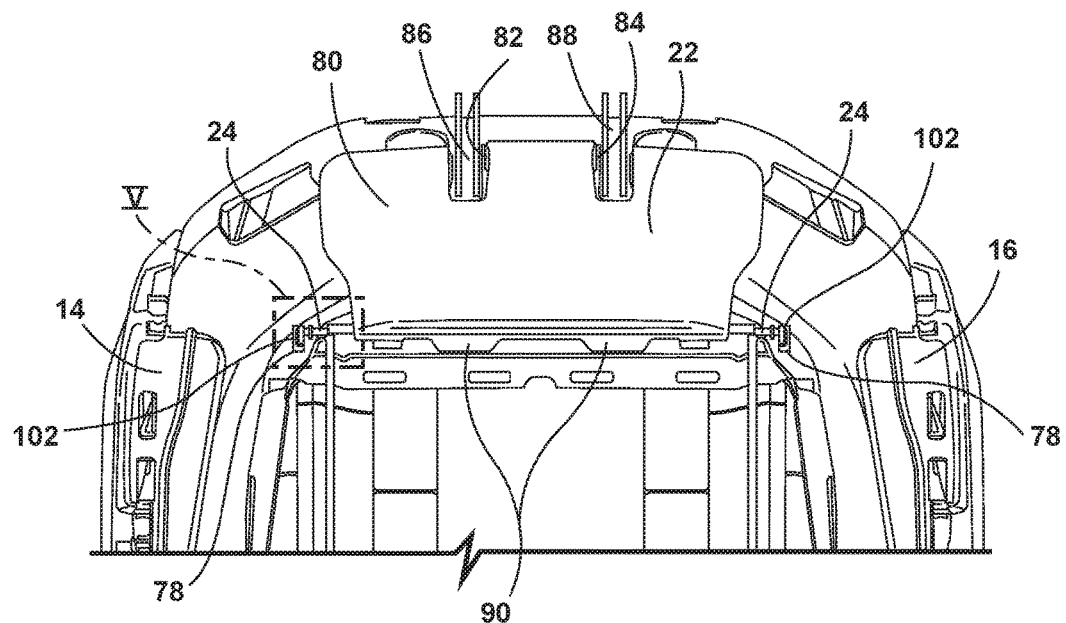
FIG. 3 is a partial front elevational view of a seating assembly of the present disclosure.
Figure 4:
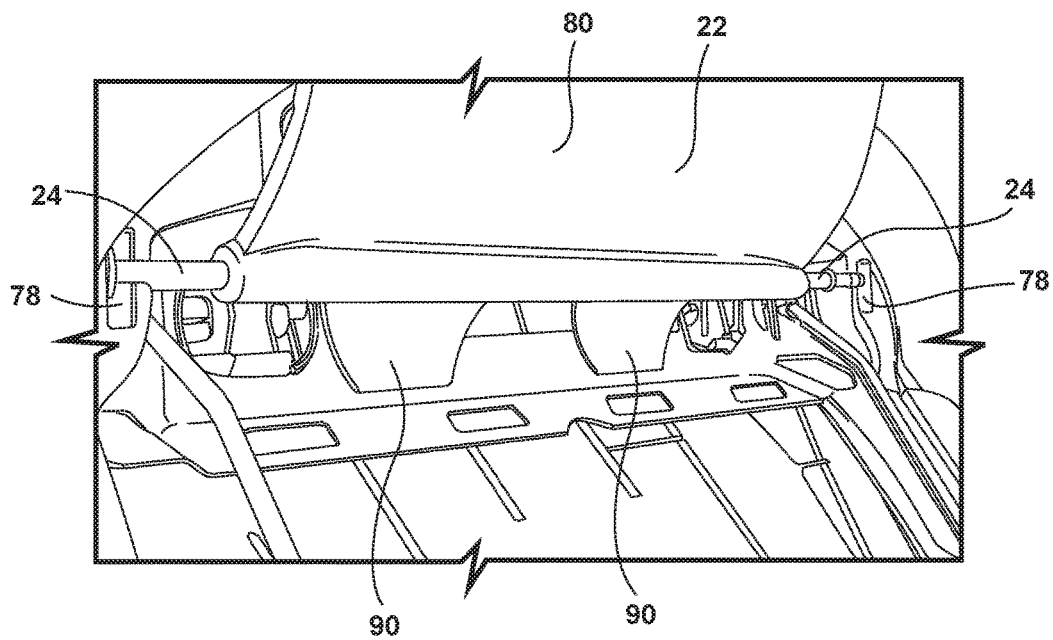
FIG. 4 is a partial perspective view of a lower pivot rod for use with a seating assembly of the present disclosure.

With reference now to FIGS. 3 and 4, the paddle 22 is illustrated in further detail. The paddle 22 includes an arcuate body 80 that extends across an upper portion of the seatback 18. The paddle 22 is rotatable about an axis defined by the lower pivot rod 24. The lower pivot rod 24 is configured to extend through apertures 78 defined in each of the first and second side members 14, 16, of the frame 12. The lower pivot rod 24 may be operably coupled with, or may be integrally formed as part of, the paddle 22. The arcuate body 80 generally follows the contours of the upper back of an occupant. In addition, the paddle 22 includes first and second upper slots 82, 84 configured to align with first and second alignment features 86, 88, in the form of upper support flanges, disposed on a top portion of the frame 12 of the seating assembly 10. As the paddle 22 moves to a retracted position, the first and second upper slots 82, 84 receive the first and second alignment features 86, 88 of the frame 12.

With reference again to FIG. 4, the paddle 22 includes lower spring tabs 90 that rotate the paddle 22 to the retracted position when the bladder 30 is in the deflated condition. The lower spring tabs 90 act against a cross-member 92 that extends laterally between the first and second side members 14, 16. The spring tabs 90 may be formed as part of the paddle 22 or may be features operably coupled with the paddle 22. The paddle 22 may include a single spring tab 90 or several spring tabs 90. Regardless, the spring tabs 90 deflect against the cross-member 92 as the bladder 30 inflates and rotates the paddle 22 forward. As the bladder 30 deflates, the spring tabs 90 force rotation of the paddle 22 back to the retracted position.

Figure 5:
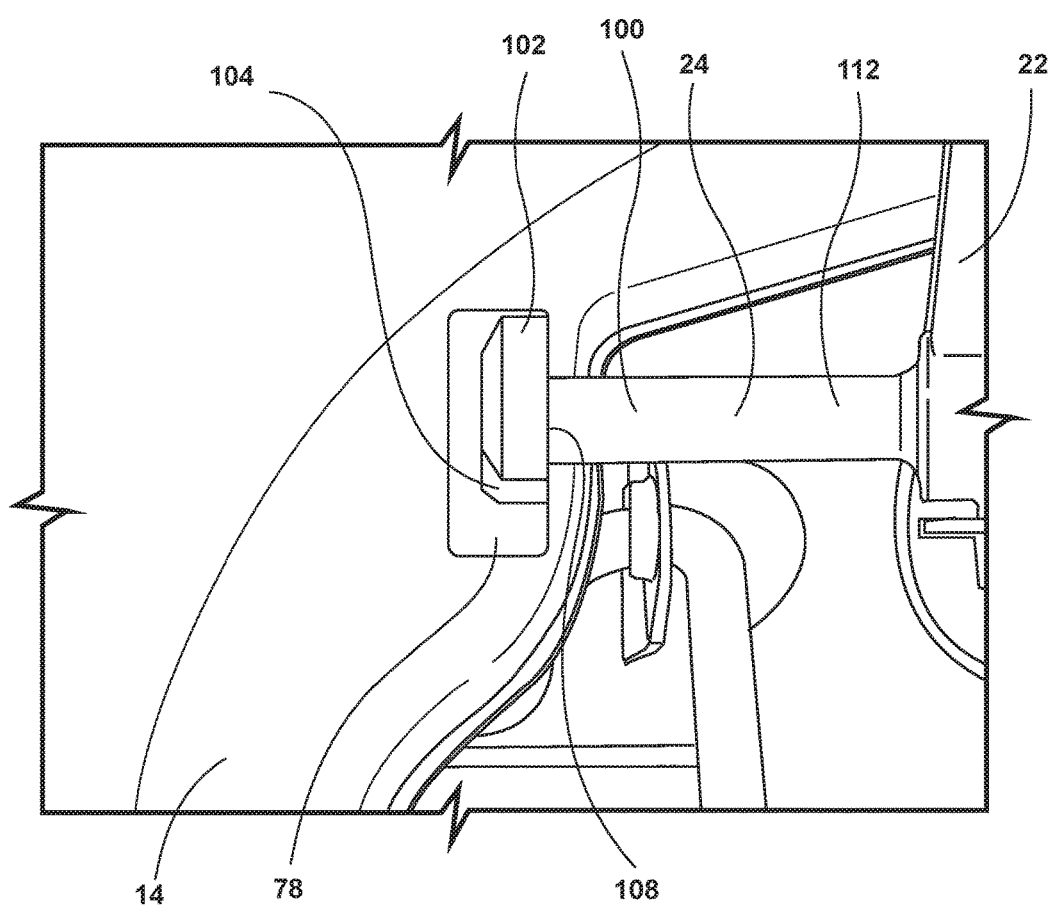
FIG. 5 is a partial front elevational view of a rod cap that is rotatably coupled with a seat frame of a seating assembly of the present disclosure.

With reference now to FIG. 5, distal ends 100 of the lower pivot rod 24 include a hub in the form of rod caps 102 that have a generally circular configuration. Each rod cap 102 includes a tab 104 that prevents overtravel of the paddle 22 when the paddle 22 moves to an extended position. The rod caps 102 may be snap-fittingly engaged with the first and second side members 14, 16. Stops 106 (FIG. 8) on a back portion of the first and second side members 14, 16 are configured to abut the tabs 104 on the rod caps 102 of the lower pivot rod 24. Overtravel tabs may also be positioned on the rod caps 102 to prevent the paddle 22 from moving too far rearward when the bladder 30 moves to the deflated condition and the paddle 22 moves to the retracted position. In the illustrated embodiment of FIG. 5, an outer portion 108 of the lower pivot rod 24 extends through and rotates within the receiving aperture 78 in each of the first and second side members 14, 16. An inner portion 112 of the lower pivot rod 24 proximate the paddle 22 may be exposed or may be coated with a plastic or other polymeric material. It will be understood that the paddle 22 may be constructed from a variety of materials, including plastic, metal, etc. Regardless of the material choice, the paddle 22 will have at least some limited ability to deflect under the weight of an occupant, yet provide sufficient support to the upper back of an occupant.

Figure 6:
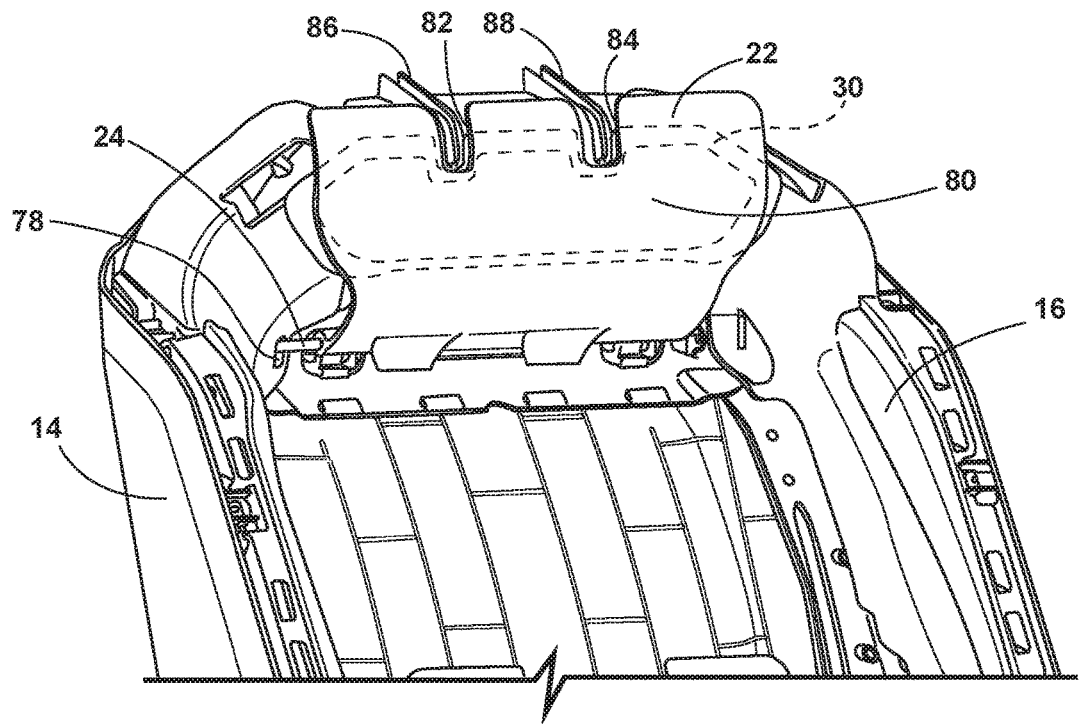
FIG. 6 is a front perspective view of a paddle for use with a seating assembly of the present disclosure.

With reference now to FIG. 6, the distal ends 100 of the lower pivot rod 24 extend into the receiving aperture 78, but are hidden behind a front side of the first and second side members 14, 16. The bladder 30 is disposed behind the paddle 22. The bladder 30 may be operably coupled with a rear portion of the frame 12 via fasteners, adhesive, hook-and-loop attachments, etc. A forward portion of the bladder 30 is slidably coupled with a rear portion of the paddle 22. Accordingly, as the bladder 30 inflates, the paddle 22 rotates forward sliding against the paddle 22. It will be understood that the bladder 30 may also be operably coupled with a back side of the paddle 22 and slidably coupled with the top portion of the frame 12. In this instance, as the bladder 30 inflates, the bladder 30 would slide along the top portion of the frame 12. Regardless, the bladder 30 is operable between the inflated and deflated conditions to move the paddle 22 between the extended position and the retracted position, respectively. Further, it will be understood that the paddle 22 is hidden below the upper thoracic cushion 74 of the seatback 18. Accordingly, the paddle 22 is not exposed to the occupant.

Figure 7A:
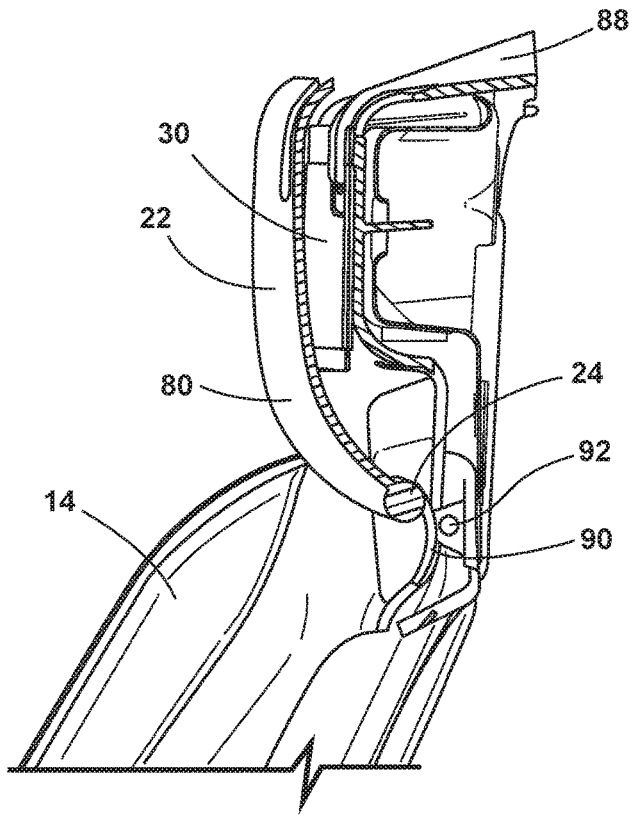
FIG. 7A is a side cross-sectional view of a paddle operably coupled with a seating assembly of the present disclosure and in a retracted position.
Figure 7B:
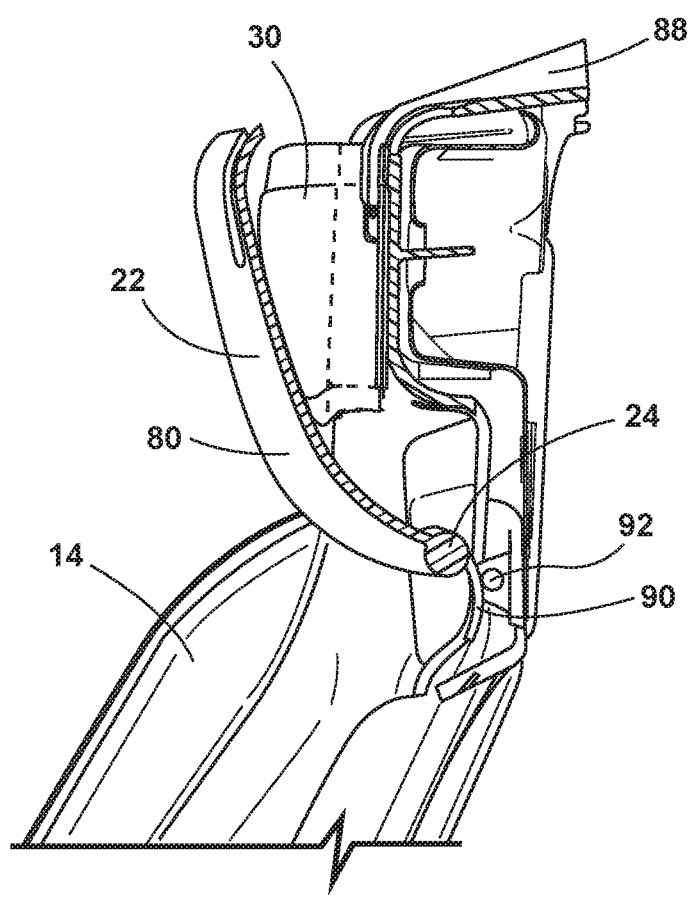
FIG. 7B is a side elevational cross-sectional view of the seating assembly of FIG. 7A with the paddle in an extended position.

With reference now to FIGS. 7A and 7B, movement of the paddle 22 from the retracted position to the extended position is illustrated. Movement of the paddle 22 from the retracted position to the extended position is made possible by the bladder 30, which is operable between the deflated condition (FIG. 7A) and the inflated condition (FIG. 7B). As previously noted, the tabs 104 on the rod caps 102 are configured to engage the stops 106 on the first and second side members 14, 16 of the frame 12 to prevent overtravel of the paddle 22.

Figure 8:
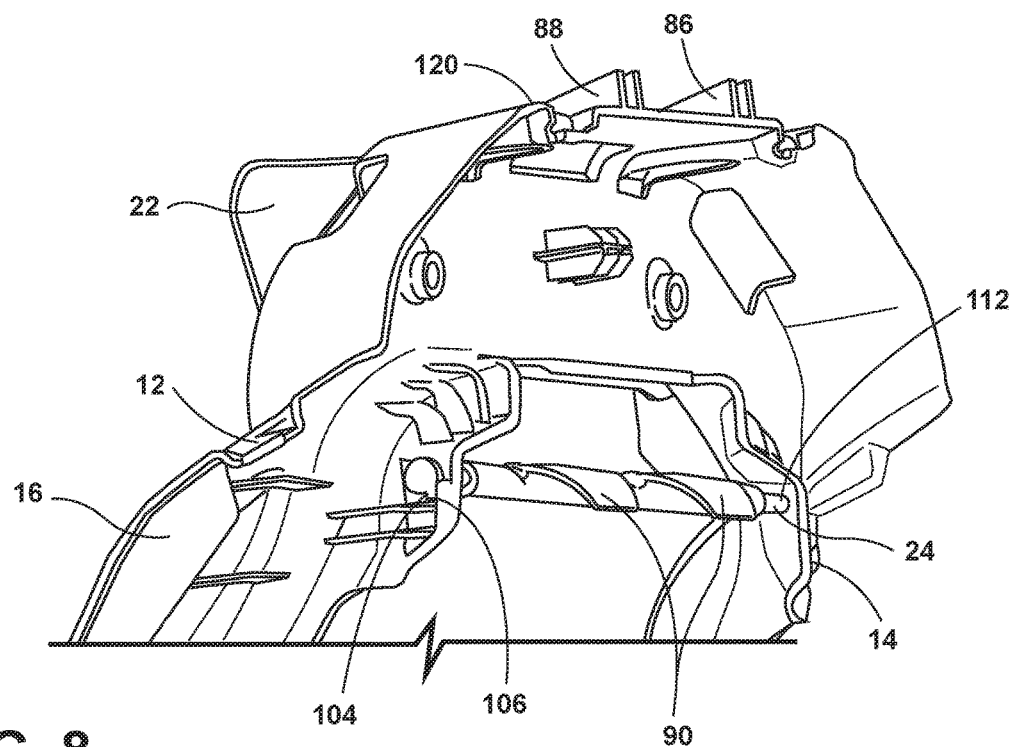
FIG. 8 is a rear perspective view of a seat frame of a seating assembly of the present disclosure.
Figure 9:
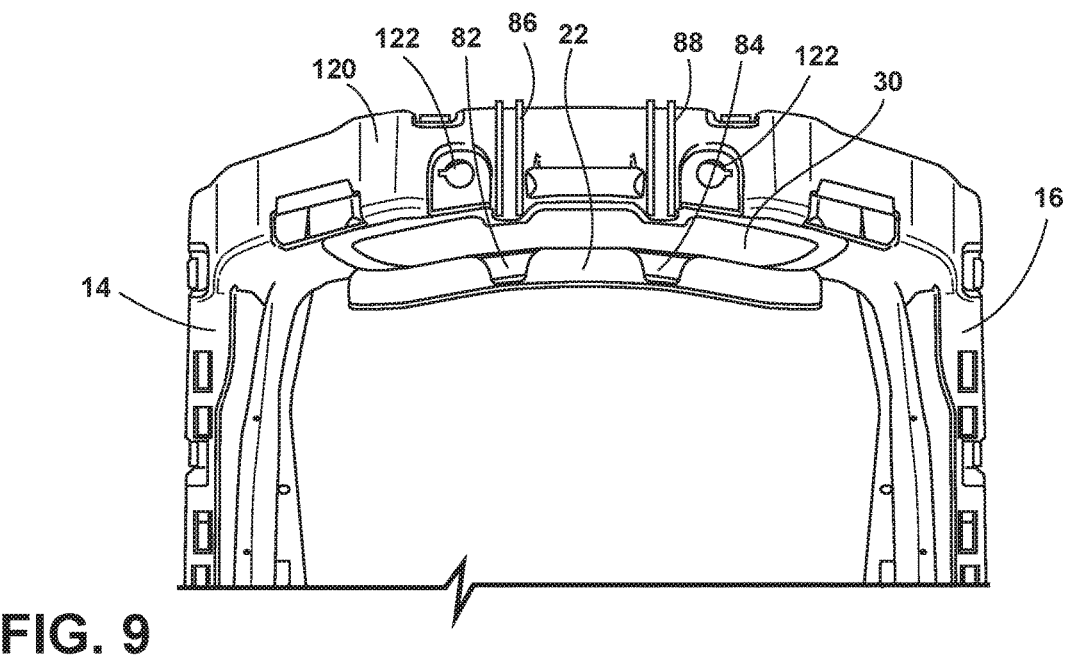
FIG. 9 is a top plan view of a seating assembly of the present disclosure.

With reference now to FIGS. 8 and 9, the seating assembly 10 is illustrated in more detail with portions of the seating assembly 10 removed to show the inner workings of the paddle 22 and movement of the 22 relative to the seatback 18. Notably, the paddle 22 is disposed in the top portion of the seatback 18 behind the upper thoracic cushion 74. An upper cross-member 120 of the frame 12 includes post receiving apertures 122 configured to receive posts of the head restraint 20. It is generally contemplated that the paddle 22 and the upper thoracic cushion 74 are designed to act in concert with the head restraint 20 to provide a uniform support interface to the upper back, neck, and head of an occupant. As noted herein, it will also be understood that the degrees of support between the upper thoracic cushion 74 and the head restraint 20 may vary, depending on occupant preferences, as well as the size and shape of the head, neck, and upper back of varying occupants.

Figure 10:
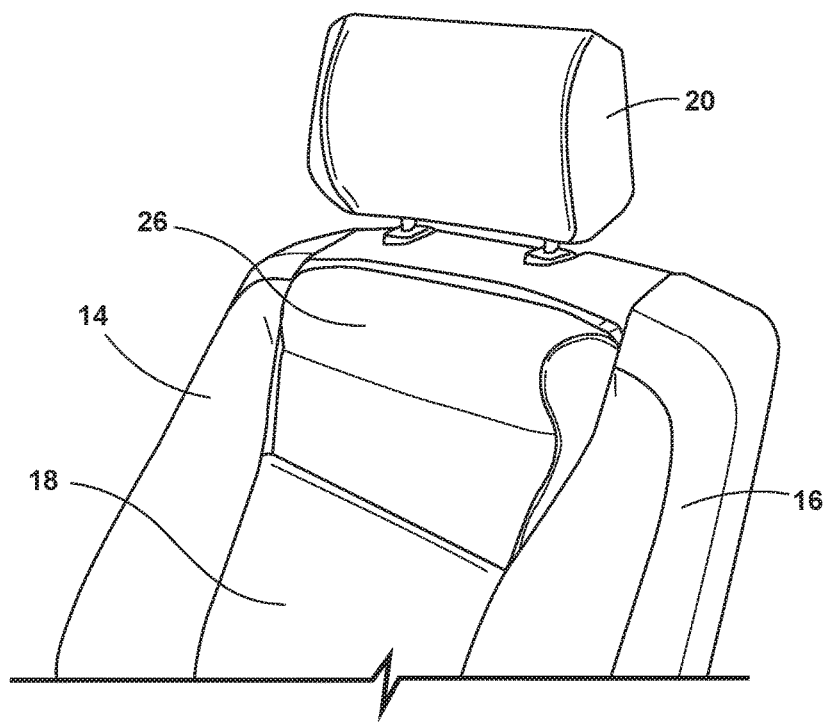
FIG. 10 is a side perspective view of an upper thoracic cushion support for a seating assembly of the present disclosure in a retracted position.
Figure 11:
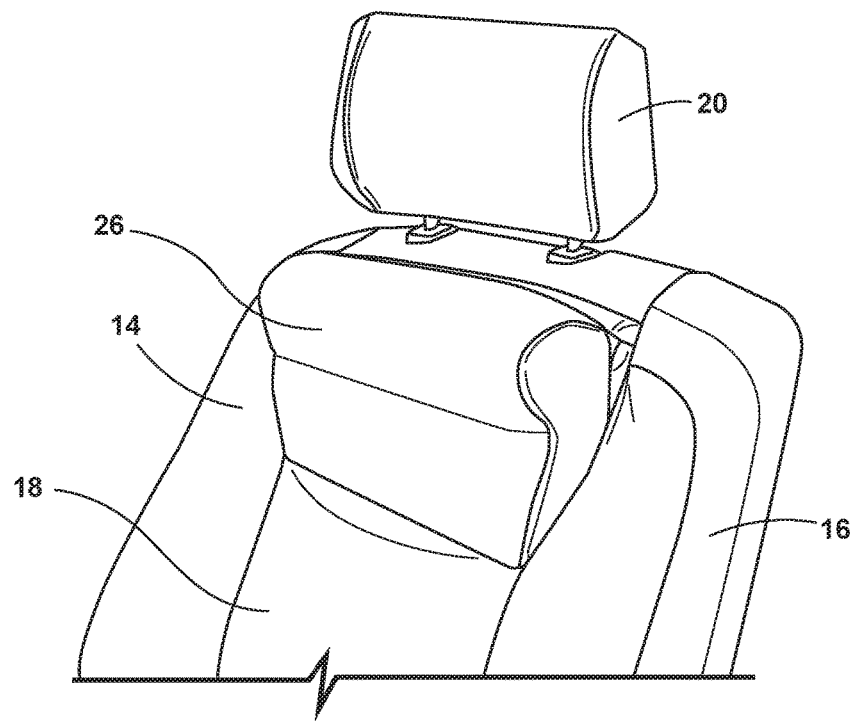
FIG. 11 is a side perspective view of an upper thoracic cushion support for a seating assembly of the present disclosure in an extended position.
Figure 12:
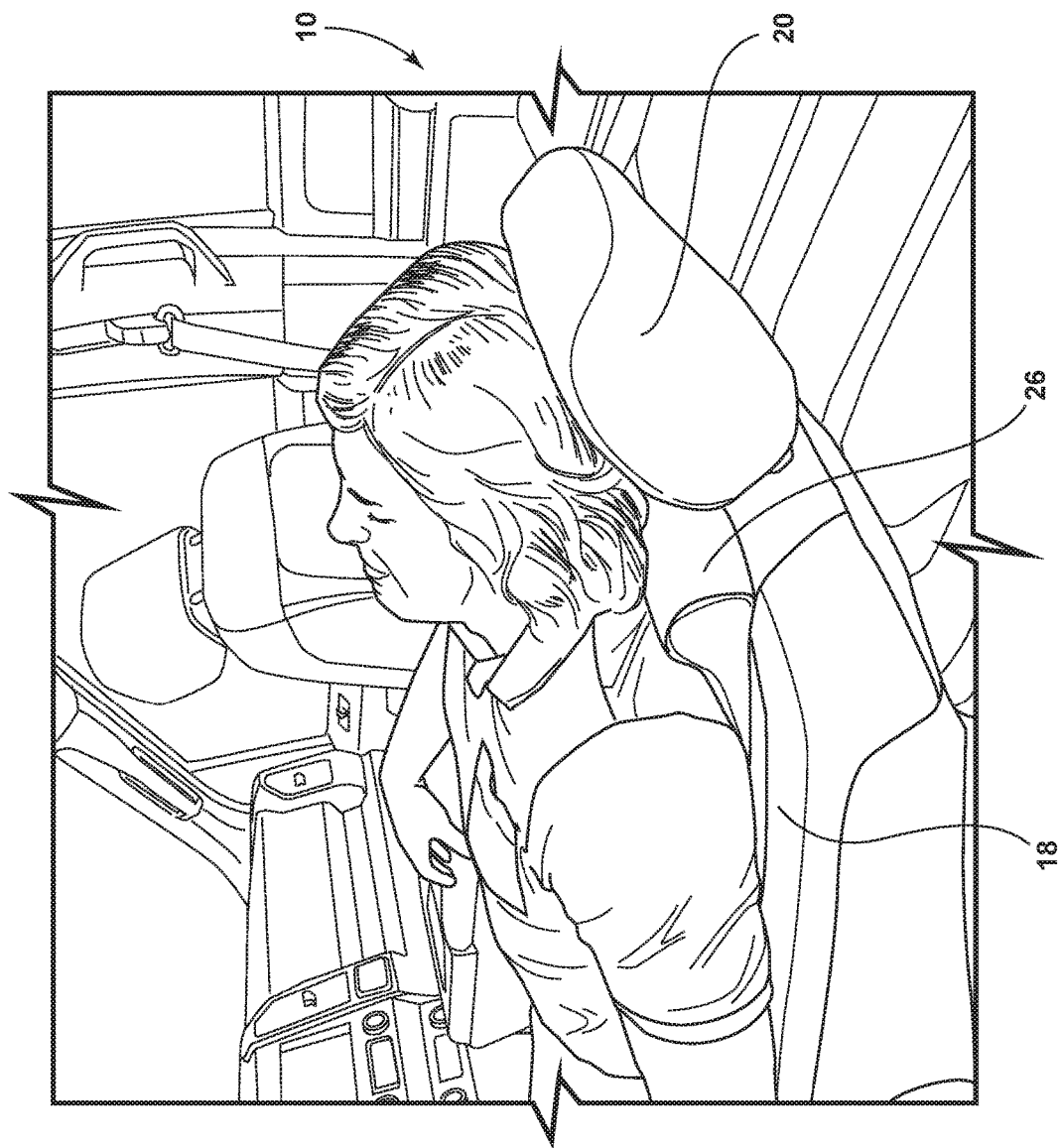
FIG. 12 is a rear perspective view of an occupant utilizing the upper thoracic support of a seating assembly of the present disclosure.

With reference now to FIGS. 10-12, movement of the upper thoracic cushion 74 is illustrated. The upper thoracic cushion 74 is operable between the retracted position (FIG. 10) and the extended position (FIG. 11) as a result of the paddle 22 behind the upper thoracic cushion 74 rotating forward and rearward about the lower pivot rod 24. It will be understood that the paddle 22 may be adjusted via a manual operation of an actuator that activates a fluid pump (e.g., an air pump) in fluid communication with the bladder 30 and which inflates or deflates the bladder 30. It will also be understood that the bladder 30 may be part of an autonomous comfort system that inflates and deflates based on user preferences, or based on the relative rotation of the seatback 18 relative to the seat 60. For example, the seatback 18 may rotate relative to the seat 60 to align the seatback 18 with the seat (so an occupant can rest or sleep), and in so doing, the bladder 30 may inflate incrementally as the seatback 18 lowers. In addition, the bladder 30 may be conditioned to deflate as the seatback 18 returns to a more vertical position (typically used for commuting). The volume of fluid (most likely air) provided to the bladder 30 may be dictated by a control circuit operably coupled with the fluid pump. The control circuit may also be operable to receive instructions to allow for manual inflation and deflation of the bladder 30, resulting in a desired condition of the upper thoracic cushion 74 between extended and retracted positions.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seating assembly comprising:
   a frame having first and second side members;
   a seatback and a head restraint supported on the frame;
   a paddle having a lower pivot rod pivotally coupled between the first and second side members of the frame, the paddle being disposed proximate a top portion of the seatback, below the head restraint; and
   a bladder disposed between the paddle and the frame and operable between:
      an inflated condition wherein the paddle is pivoted forward to support one of the upper back and neck of an occupant; and
      a deflated condition wherein the paddle is pivoted rearward into the seatback.

2. The vehicle seating assembly of claim 1, further comprising:
   first and second upper support flanges extending upwardly from the seatback.

3. The vehicle seating assembly of claim 2, further comprising:
   first and second slots configured to align with the first and second upper support flanges.

4. The vehicle seating assembly of claim 1, further comprising:
   a cushion assembly disposed on the paddle.

5. The vehicle seating assembly of claim 1, further comprising:
   a hub disposed on each end of the lower pivot rod and including an overtravel tab configured to prevent over rotation of the paddle.

6. The vehicle seating assembly of claim 5, further comprising:
   apertures defined in the first and second side members, the apertures configured to receive the hubs of the lower pivot rod in a snap-fitting engagement.

7. The vehicle seating assembly of claim 1, further comprising:
   spring tabs disposed below the lower pivot rod, the spring tabs being configured to rotate the paddle rearward upon deflation of the bladder.

8. A seating assembly comprising:
   a frame having first and second side members;
   a seatback supported on the frame;
   a paddle having a lower pivot rod pivotally coupled between the first and second side members of the frame;
   a bladder disposed between the paddle and the frame and operable between an inflated condition corresponding to a forward position of the paddle and a deflated position corresponding to a rearward position of the paddle, and
   a hub disposed on each end of the lower pivot rod and including an overtravel tab configured to prevent over rotation of the paddle.

9. The seating assembly of claim 8, further comprising:
   first and second upper support flanges extending upwardly from the seatback.

10. The seating assembly of claim 9, further comprising:
    first and second slots configured to align with the first and second upper support flanges.

11. The seating assembly of claim 8, further comprising:
    a cushion assembly disposed on the paddle.

12. The seating assembly of claim 8, further comprising:
    apertures defined in the first and second side members, the apertures configured to receive the hubs of the lower pivot rod in a snap-fitting engagement.

13. The seating assembly of claim 8, further comprising:
    spring tabs disposed below the lower pivot rod, the spring tabs being configured to rotate the paddle rearward upon deflation of the bladder.

14. A vehicle seating assembly comprising:
    a frame;
    a seatback supported on the frame;
    a paddle pivotally coupled with an upper portion of the frame;
    a bladder disposed between the paddle and the frame and configured to inflate to pivot the paddle between forward and rearward positions relative to the frame; and
    springs tabs disposed below a lower pivot rod, the spring tabs being configured to rotate the paddle rearward upopn deflation of the bladder.

15. The vehicle seating assembly of claim 14, further comprising:
    first and second upper support flanges extending upwardly from the seatback.

16. The vehicle seating assembly of claim 15, further comprising:
    first and second slots configured to align with the first and second upper support flanges.

17. The vehicle seating assembly of claim 14, further comprising:
    a cushion assembly disposed on the paddle.

18. The vehicle seating assembly of claim 14, further comprising:
    a hub disposed on each end of the lower pivot rod and including an overtravel tab configured to prevent over rotation of the paddle.

* * * * *